United States Patent
Mitchell

[15] 3,655,295
[45] Apr. 11, 1972

[54] MECHANICAL SEAL FOR CENTRIFUGAL PUMPS

[72] Inventor: William Mitchell, Dover, N.J.
[73] Assignee: Eco Pump Corporation, South Plainfield, N.J.
[22] Filed: Oct. 1, 1970
[21] Appl. No.: 77,239

[52] U.S. Cl. .................................. 415/113, 415/173 A
[51] Int. Cl. .......................................... F01d 11/00
[58] Field of Search ..................... 415/113, 109, 173 A

[56] References Cited

UNITED STATES PATENTS

| | | |
|---|---|---|
| 3,162,135 | 12/1964 | Nichols et al. ................. 415/109 |
| 2,936,715 | 5/1960 | Southam et al. ............. 415/173 A |
| 1,932,214 | 10/1933 | Hornschuch ..................... 415/109 |
| 2,258,527 | 10/1941 | Warman ........................... 415/113 |
| 2,711,332 | 6/1955 | Audemar ......................... 415/113 |
| 2,779,611 | 1/1957 | Wernert ........................... 415/113 |
| 2,787,960 | 4/1957 | Wightman .................... 415/173 A |
| 3,228,342 | 1/1966 | Page ................................ 415/113 |

Primary Examiner—C. J. Husar
Attorney—Ralph Burch

[57] ABSTRACT

A mechanical seal for centrifugal pumps having a fixed bearing mounted in the housing of the pump for supporting the shaft of the pump, a rotating sealing disk mounted on the shaft in contact with the fixed bearing, the bearing and sealing disk being surrounded by a cavity formed in the housing and a cup shaped slinger mounted on the shaft between the cavity and impeller of the pump for introducing and retaining fluid in the cavity for lubricating and cooling the bearing and sealing disk even when the flow of fluid through the pump stops.

1 Claim, 2 Drawing Figures

PATENTED APR 11 1972　3,655,295
FIG.1
FIG.2
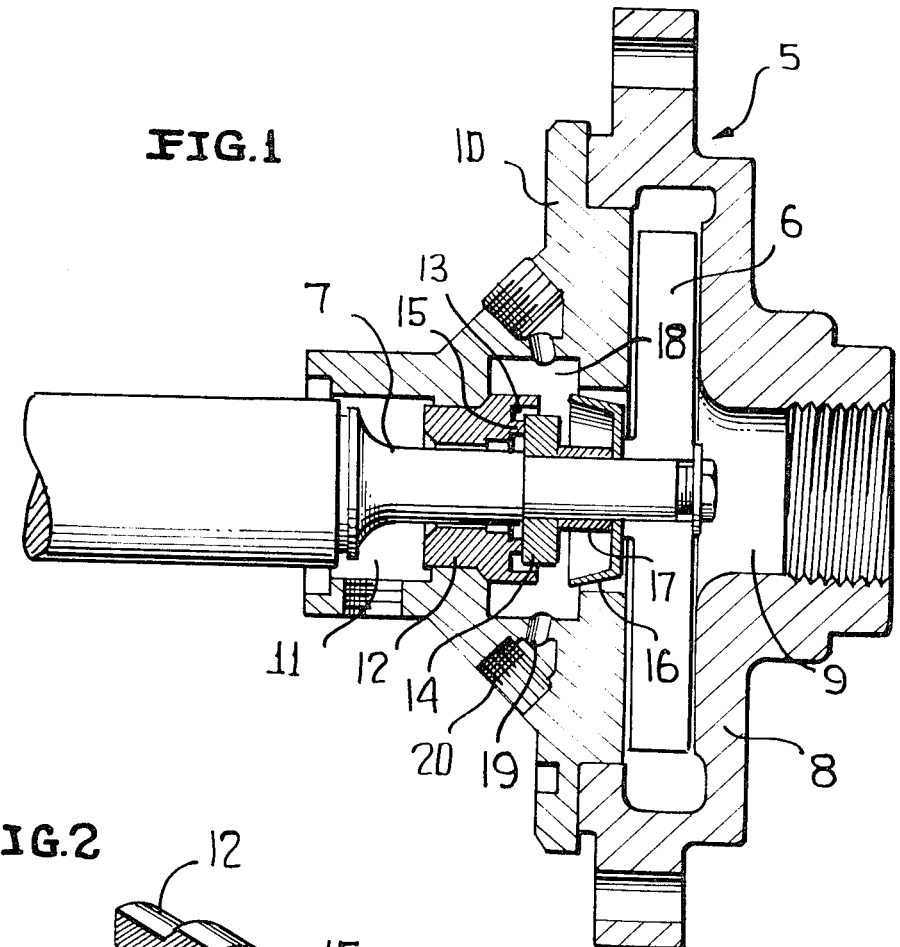
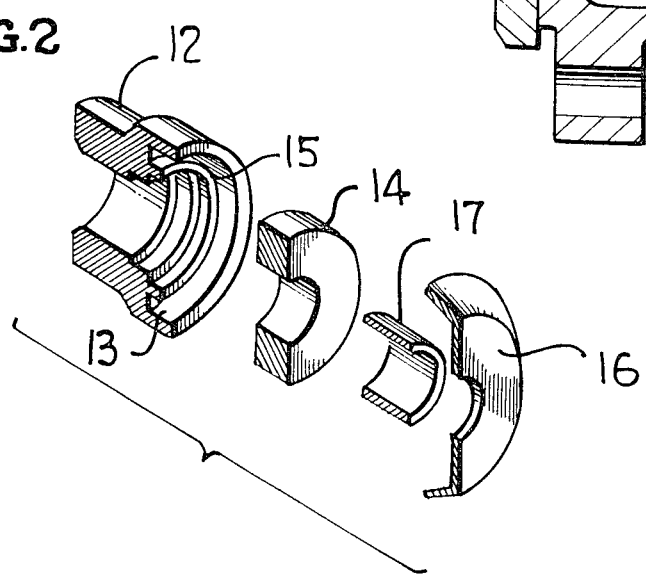
INVENTOR
WILLIAM MITCHELL
By Ralph Burch
ATTORNEY

MECHANICAL SEAL FOR CENTRIFUGAL PUMPS

The primary object of the invention is to provide a rotary seal for centrifugal pumps which is lubricated and cooled by fluid flowing through the pump and having means for retaining fluid around the seal upon fluctuation or stoppage of fluid flow through the pump.

A further object of the invention is to provide a rotary seal surrounded by a cavity in the pump housing and a rotary slinger for admitting and retaining fluid in the cavity to lubricate and cool the seal.

Another object of the invention is to provide a cup shaped slinger for admitting and retaining fluid in a cavity surrounding the seal of the pump shaft, the outer wall of the slinger being tapered outwardly towards the cavity.

Other objects and advantages of the invention will be apparent during the course of the following description.

In the accompanying drawing forming a part of this specification,

FIG. 1 is a longitudinal sectional view of the pump and seal, and,

FIG. 2 is a perspective view of the component parts of the pump seal in longitudinal section and spaced relation.

Referring to the drawing, a centrifugal pump is shown including a housing 5, a rotary impeller 6 mounted in the housing on the end of a rotating shaft 7. The housing comprises a front section 8 having an axial inlet opening 9 and a rear section 10 having a longitudinal bore 11 to receive the shaft 7 which is rotatably supported in the bore by a fixed bearing 12 disposed in spaced relation to the impeller 6. The inner end of bearing 12 is recessed at 13 to receive a rotating sealing disk 14 mounted on shaft 7 which abuts against an annular rib 15 formed in the recess 13. A cup shaped slinger 16 is fixedly mounted on shaft 7 adjacent the impeller 6 and is held in spaced relation to the sealing disk 14 by a sleeve 17. The outer wall of the slinger is inclined outwardly in close relation to the wall of the enlarged cavity 18 formed in the bore 11. The cavity 18 is provided with drain openings 19 for draining and flushing the cavity which are normally closed by screw plugs 20.

In operation, some of the fluid being pumped by the impeller 6 will pass around the wall of the slinger 16 into the cavity 18 to lubricate and cool the sealing disk 14. If there is a flow volume fluctuation or stoppage of fluid flow through the pump the fluid in the cavity 18 will be retained in the cavity by rotation of the slinger 16 so as to prevent the seal and bearing from burning up due to excess friction without having to stop the pump.

Having thus described my invention, I claim:

1. In a centrifugal pump, a pump housing comprising a front section having a pumping cavity and axial inlet opening, a rear section having a longitudinal bore, a bearing fixedly mounted in said bore having a recess in its inner end, a shaft rotatably mounted in said bearing and extending into the pumping cavity of said front section, an impeller mounted on the free end of said shaft in spaced relation to said bearing, a sealing disk mounted on said shaft and disposed in the recess of said bearing, a cavity formed in the rear section of said housing surrounding said shaft and sealing disk, and a cup shaped slinger fixedly mounted on said shaft between said impeller and sealing disk having its side walls inclined outwardly in close spaced relation to the wall of the cavity in the rear section of said housing.

* * * * *